United States Patent
Liu et al.

(10) Patent No.: US 12,470,766 B2
(45) Date of Patent: Nov. 11, 2025

(54) LIVE-STREAM INTERACTION METHOD, SYSTEM AND RELATED DEVICE

(71) Applicant: Beijing Youzhuju Network Technology Co., Ltd., Beijing (CN)

(72) Inventors: Ji Liu, Beijing (CN); Xiaoben Wang, Beijing (CN); Feifei Tang, Beijing (CN); Zihao Chen, Beijing (CN); Zaiyou Ruan, Beijing (CN); Yuna Hu, Beijing (CN); Man Zhang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/394,880

(22) Filed: Dec. 22, 2023

(65) Prior Publication Data
US 2024/0137600 A1    Apr. 25, 2024

Related U.S. Application Data

(63) Continuation of application No. PCT/CN2022/125600, filed on Oct. 17, 2022.

(30) Foreign Application Priority Data

Nov. 8, 2021  (CN) .......................... 202111316021.0

(51) Int. Cl.
*H04N 21/43* (2011.01)
*H04N 21/2187* (2011.01)
(Continued)

(52) U.S. Cl.
CPC ..... *H04N 21/4312* (2013.01); *H04N 21/2187* (2013.01); *H04N 21/23418* (2013.01); *H04N 21/4788* (2013.01)

(58) Field of Classification Search
CPC .......... H04N 21/4312; H04N 21/2187; H04N 21/23418; H04N 21/4788
See application file for complete search history.

(56) References Cited

U.S. PATENT DOCUMENTS

| | | | |
|---|---|---|---|
| 11,483,275 B1* | 10/2022 | Warner | ................ G06F 3/0482 |
| 2016/0277802 A1* | 9/2016 | Bernstein | ......... H04N 21/44213 |

(Continued)

FOREIGN PATENT DOCUMENTS

| | | |
|---|---|---|
| CN | 106162369 A | 11/2016 |
| CN | 106878820 A | 6/2017 |

(Continued)

OTHER PUBLICATIONS

International Search Report in PCT/CN2022/125600, mailed Dec. 13, 2022, 3 pages.

(Continued)

*Primary Examiner* — Michael R Telan
(74) *Attorney, Agent, or Firm* — Astute IP Law Group

(57) ABSTRACT

The present disclosure provides a live-stream interaction method, a live-stream interaction system and related devices. The system includes a terminal of an audience, a terminal of an anchor, and a server; the terminal of the audience is configured to present a live-stream interface, and the live-stream interface includes an interaction control that supports interaction, and when the audience triggers an interactive behavior through the interaction control, an interaction image when the audience performs the interactive behavior is acquired; the terminal of the anchor is configured to send the behavior feature of the anchor to the server; the server is configured to acquire the behavior feature of the audience, match the behavior feature of the audience with the behavior feature of the anchor to obtain a matching (Continued)

result, and send a special effect instruction to the terminal of the audience according to the matching result.

20 Claims, 6 Drawing Sheets

(51) Int. Cl.
  *H04N 21/234* (2011.01)
  *H04N 21/431* (2011.01)
  *H04N 21/4788* (2011.01)

(56) References Cited

U.S. PATENT DOCUMENTS

| | | | | |
|---|---|---|---|---|
| 2017/0091799 | A1* | 3/2017 | Visser | G06Q 30/0209 |
| 2018/0167427 | A1* | 6/2018 | Kedenburg, III | G06Q 50/01 |
| 2019/0253761 | A1* | 8/2019 | Yusupov | A63F 13/80 |
| 2020/0368616 | A1 | 11/2020 | Delamont | |
| 2023/0009336 | A1* | 1/2023 | Tang | H04N 21/234 |

FOREIGN PATENT DOCUMENTS

| | | |
|---|---|---|
| CN | 108234494 A | 6/2018 |
| CN | 110798696 A | 2/2020 |
| CN | 110830811 A | 2/2020 |
| CN | 110856008 A | 2/2020 |
| CN | 112601098 A | 4/2021 |
| CN | 113038149 A | 6/2021 |
| CN | 113038174 A | 6/2021 |
| CN | 114173139 A | 3/2022 |
| EP | 3588249 A1 | 1/2020 |
| WO | 2021114709 A1 | 6/2021 |

OTHER PUBLICATIONS

Office Action received for Japanese Patent Application No. 2023-579350, mailed on Nov. 19, 2024, 6 pages (3 pages of English Translation and 3 pages of Original Document).
Extended European Search Report for European Patent Application No. 22889094.3, mailed on Sep. 30, 2024, 11 pages.
Communication Pursuant to Rules 70(2) and 70a(2) EPC for European Patent Application No. 22889094.3, mailed on Oct. 17, 2024, 1 page.

\* cited by examiner

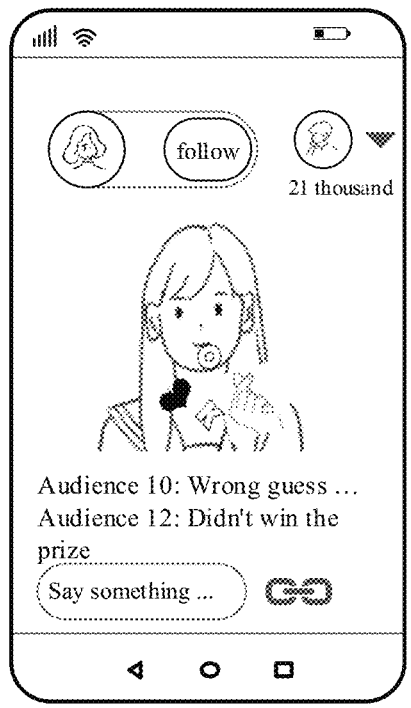
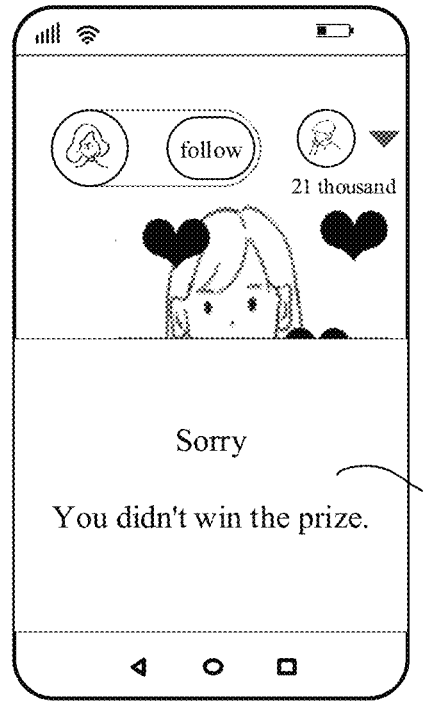
FIG. 7A
FIG. 7B
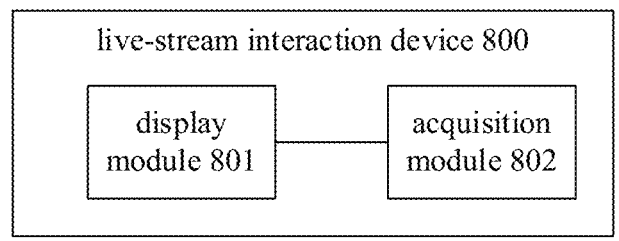
FIG. 8
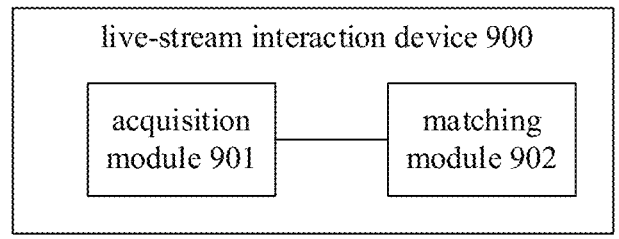
FIG. 9

LIVE-STREAM INTERACTION METHOD, SYSTEM AND RELATED DEVICE

CROSS-REFERENCE TO RELATED APPLICATION

This application is a continuation of International Application No. PCT/CN2022/125600 filed on Oct. 17, 2022, which claims priority of the Chinese Patent Application No. 202111316021.0, filed on Nov. 8, 2021. All the aforementioned patent applications are hereby incorporated by reference in their entireties.

TECHNICAL FIELD

The present disclosure relates to the technical field of computers, in particular to a live-stream interaction method, a system, a device, an apparatus, a computer-readable storage medium and a computer program product.

BACKGROUND

With the continuous development of computer technology, especially mobile internet technology, live-stream application (APP) came into being. The live-stream application can be installed in mobile phones and other terminals. Based on this, the anchor can record video based on the live-stream application on the terminal, and the terminal of the anchor will send the video to the live-stream platform in the form of video stream, and then the live-stream platform can push the video stream to the terminal of the audience, so that the audience can watch the video recorded by the anchor through the terminal of the audience.

During the live-stream, the audience can interact with the anchor in many ways. For example, the audience can trigger interactive behaviors such as likes, gifts and barrage through the terminal of the audience, which are usually displayed in a relatively fixed chat public screen area.

It takes resources (such as computing resources and storage resources) for the audience to trigger the above-mentioned interactive behaviors. However, it is difficult to get feedback from the anchor after the audience triggers the above-mentioned interactive behaviors. The interaction between the audience and the anchor is limited, and it is difficult for the audience to feel the unique sense of participation in the process of interacting with the anchor. In this way, the resources occupied by triggering the above-mentioned interactive behaviors are wasted, reducing the utilization rate of resources.

SUMMARY

The embodiments of the present disclosure aim to provide a live-stream interaction method, system, device, equipment, computer-readable storage medium and computer program product, which can improve the resource utilization rate.

In a first aspect, an embodiment of the present disclosure provides a live-stream interaction method, being applied to a terminal, wherein the method comprises:
presenting a live-stream interface, wherein the live-stream interface comprises an interaction control that supports interaction;
when an audience triggers an interactive behavior through the interaction control, acquiring an interaction image when the audience performs the interactive behavior, wherein the interaction image comprises a behavior feature of the audience; and
when the behavior feature of the audience matches a behavior feature of an anchor, presenting a special effect of successful matching on the live-stream interface.

In a second aspect, an embodiment of the present disclosure provides a live-stream interaction method, being applied to a server, wherein the method comprises:
acquiring a behavior feature of an audience and a behavior feature of an anchor, wherein the behavior feature of the audience is acquired based on an interaction image when the audience performs an interactive behavior; and
matching the behavior feature of the audience and the behavior feature of the anchor to obtain a matching result;
sending a special effect instruction to a terminal of the audience according to the matching result, wherein the special effect instruction is used to instruct the terminal of the audience to present a special effect corresponding to the matching result.

In a third aspect, an embodiment of the present disclosure provides a live-stream interaction system, comprising a terminal of an audience, a terminal of an anchor and a server, the terminal of the audience is configured to present a live-stream interface, and the live-stream interface comprises an interaction control that supports interaction; when an audience triggers an interactive behavior through the interaction control, the terminal of the audience obtains an interaction image when the audience performs the interactive behavior, wherein the interaction image comprises a behavior feature of the audience;
a terminal of the anchor is configured to send the behavior feature of the anchor to the server;
the server is configured to acquire the behavior feature of the audience, match the behavior feature of the audience with the behavior feature of the anchor, obtain a matching result, and send a special effect instruction to the terminal of the audience according to the matching result, wherein the special effect instruction is configured to instruct the terminal of the audience to present the special effect corresponding to the matching result;
the terminal of the audience is further configured to present the special effect corresponding to the matching result according to the special effect instruction.

In a fourth aspect, an embodiment of the present disclosure provides a live-stream interaction device, comprising:
a display module, configured to present a live-stream interface, wherein the live-stream interface comprises an interaction control that supports interaction; and
an acquisition module, configured to acquire an interaction image when an audience triggers an interactive behavior through the interaction control, wherein the interaction image comprises a behavior feature of the audience;
the display module further configured to present a special effect of successful matching on the live-stream interface when the behavior feature of the audience matches the behavior feature of the anchor.

In a fifth aspect, an embodiment of the present disclosure provides a live-stream interaction device, comprising:
an acquisition module, configured to acquire a behavior feature of an audience and a behavior feature of an anchor, wherein the behavior feature of the audience is acquired based on an interaction image when the audience performs an interactive behavior; and a matching module, configured to match the behavior feature of the audience and the behavior feature of the anchor to obtain a matching result; and according to the matching result, send a special effect instruction to the terminal of the audience; the special effect instruction is configured to instruct the terminal of the audience to present a special effect corresponding to the matching result.

In a sixth aspect, an embodiment of the present disclosure provides a computer-readable storage medium, storing a computer program which, realizes steps of the method described in any one of the first aspect or second aspect of the present disclosure.

In a seventh aspect, an embodiment of the present disclosure provides an electronic apparatus, comprising:
 a storage device, on which a computer program is stored; and
 a processing device, configured to execute the computer program in the storage device to realize the steps of the method described in any one of the first aspect or second aspect of the present disclosure.

In an eighth aspect, an embodiment of the present disclosure provides a computer program product, when run on a computer, causing a computer to execute the method described in any one of the first aspect or second aspect of the present disclosure.

As can be seen from the above technical scheme, the embodiment of the present disclosure has the following advantages:
 in this method, the audience can trigger interactive behaviors through the interaction controls on the live-stream interface, and the terminal of the audience obtains the interaction image when the audience performs the interactive behaviors, so that the audience can feel the unique sense of participation in interacting with the anchor when the audience performs the interactive behaviors. Moreover, the interaction image of the audience carries the behavior features of the audience, when the behavior features of the audience match the behavior features of the anchor, the live-stream interface presents the special effects that represents successful matching, so that the audience can perceive the feedback of the anchor and improve the audience experience. Therefore, this method can reduce the waste of resources used by terminals, servers and other devices to obtain the interactive behavior of the audience, and improve the utilization rate of resources.

Other features and advantages of embodiments of the present disclosure will be described in detail in the detailed description section that follows.

BRIEF DESCRIPTION OF DRAWINGS

In order to explain the technical methods of the embodiment of the present disclosure more clearly, the drawings needed in the embodiment will be briefly introduced below.

FIG. 7A is a schematic diagram of a special effect of failed matching provided by an embodiment of the present disclosure;

FIG. 7B is a schematic diagram of a non-winning prompt message provided by an embodiment of the present disclosure;

FIG. 8 is a schematic diagram of a live-stream interaction device provided by an embodiment of the present disclosure;

FIG. 9 is a schematic diagram of another live-stream interaction device provided by an embodiment of the present disclosure;

DETAILED DESCRIPTION

Figure 1:
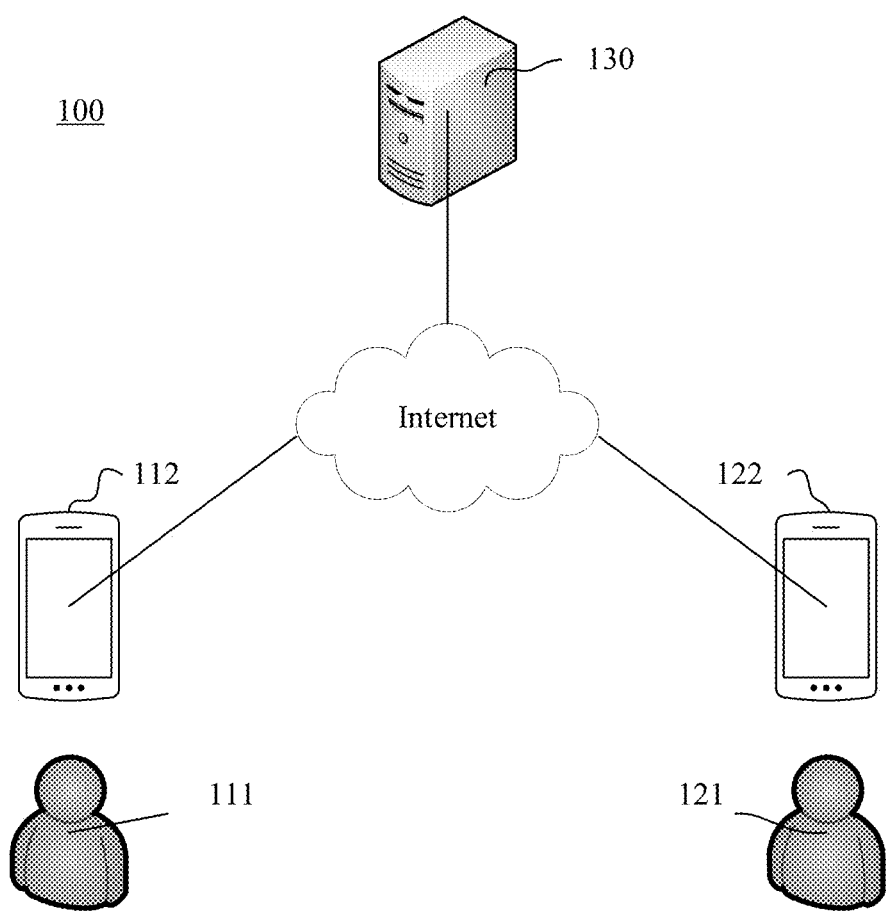
FIG. 1 is an architecture diagram of a live-stream interaction system provided by an embodiment of the present disclosure.

The terms "first" and "second" in the embodiment of this disclosure are only used for descriptive purposes, and cannot be understood as indicating or implying relative importance or implicitly indicating the number of indicated technical features. Therefore, the features defined as "first" and "second" may include one or more of these features explicitly or implicitly.

Firstly, some technical terms involved in the embodiment of this disclosure are introduced.

The live-stream application can be installed in terminals such as mobile phones, and the anchor can perform live-stream based on the live-stream application on the terminal. For example, the anchor can broadcast live classroom teaching, sports events, entertainment performances, etc., and the audience can also watch the above content broadcast live by the anchor based on the live-stream application on the terminal.

Usually, the audience can interact with the anchor by triggering interactive behaviors, such as sending barrage, giving likes and giving gifts. It takes up computing resources, storage resources, etc. for the audience to trigger the above-mentioned interactive behaviors. However, the above-mentioned interactive behaviors are unilateral behaviors of the audience and it is difficult to get feedback from the live-stream. It can be seen that the interaction between the audience and the anchor is limited, and it is difficult for the audience to feel the unique sense of participation in the interaction with the anchor, which leads to the waste of resources occupied by triggering the above interaction behaviors and reducing the utilization rate of resources.

In view of this, the embodiment of the present disclosure provides a live-stream interaction method. In this method, the audience can trigger the interactive behavior through the interaction controls on the live-stream interface, and the terminal of the audience obtains the interaction image when the audience performs the interactive behaviors, so that the audience can feel the unique sense of participation in interacting with the anchor when the audience performs the interactive behaviors. Moreover, the interaction image of the audience carries the behavior features of the audience. When the behavior features of the audience match the behavior features of the anchor, the live-stream interface presents the special effect of successful matching, so that the audience can perceive the feedback of the anchor and improve the audience experience.

Therefore, this method can reduce the waste of resources occupied by terminals, servers and other devices to obtain the audience's interactive behaviors, and improve the utilization rate of resources.

This method can also be applied to live-stream applications. When this method is applied to live-stream application, it is realized in the form of computer program. In some embodiments, the computer program can be independent, for example, it may be an independent application with corresponding functions. In other embodiments, the computer program may be a functional module, a plug-in, etc., attached to the existing live-stream application to run.

The live-stream interaction method provided by the embodiment of the present disclosure can be cooperatively executed by a terminal (e.g., a terminal installed with a live-stream application) and a server (e.g., a server of a live-stream application). In order to make the technical scheme of the embodiment of the present disclosure clearer and easier to understand, the architecture of the live-stream interaction system provided by the embodiment of the present disclosure will be introduced with the attached drawings.

Referring to the system architecture diagram of the live-stream interaction system 100 shown in FIG. 1, the live-stream interaction system 100 includes a terminal 112 of an audience 111, a terminal 122 of an anchor 121 and a server 130. The terminal 112 of the audience 111, the terminal 122 of the anchor 121 and the server 130 are connected through a network. Among them, the terminal includes but are not limited to smart phones, tablet computers, notebook computers, personal digital assistant (PDA) or smart wearable devices. The server 130 may be a cloud server, such as a central server in a central cloud computing cluster or an edge server in an edge cloud computing cluster. Of course, the server 130 may also be a server in a local data center. Local data center refers to the data center directly controlled by users.

In the live-stream interaction system 100, the anchor 121 can broadcast live through the live application installed on the terminal 122, for example, the anchor 121 can broadcast live entertainment performances, sports events, etc. The anchor 121 can initiate a lottery during the live-stream to improve the heat in the live-stream room. The audience 111 can watch the content (such as entertainment performances and sports events) broadcast live by the anchor 121 through the live-stream application installed on the terminal 112, and the audience 111 can also participate in the lottery initiated by the anchor 121.

Specifically, the anchor 121 selects a behavior feature through the terminal 122 and sends the behavior feature selected by the anchor to the server 130. The audience 111 can trigger an interactive behavior through the interaction control in the live-stream interface presented by the terminal 112, and the terminal 112 obtains an interaction image when the audience performs the interactive behavior, for example, the terminal 112 shoots an interaction image when the audience performs the interactive behavior through a camera device, and the interaction image includes the behavior feature of the audience. In this way, in the process of interactive behavior, the audience can feel the unique sense of participation in interacting with the anchor.

In some examples, the terminal 112 of the audience 111 can send the interaction image to the server 130, and the server 130 can recognize the behavior feature of the audience from the interaction image. In other examples, the terminal 112 of the audience 111 can recognize the interaction image, obtain the behavior features of the audience, and send the behavior features of the audience to the server 130.

After the server 130 obtains the behavior feature of the audience and the behavior feature of the anchor, the server 130 matches the behavior features of the audience and the behavior features of the anchor to obtain a matching result, and then based on the matching result, the server 130 sends a special effect instruction to the terminal 112 of the audience 111, the special effect instruction is used to instruct the terminal 112 of the audience 111 to present a special effect corresponding to the matching result.

The terminal 112 of the audience 111 presents a special effect corresponding to the matching result according to the special effect instruction. For example, when the matching result indicates that the behavior feature of the audience matches the behavior feature of the anchor, the terminal 112 presents a special effect of successful matching. When the matching result indicates that the behavior feature of the audience does not match the behavior feature of the anchor, the terminal 112 presents a special effect of match failure, and gives the audience feedback with strong perception.

Figure 2:
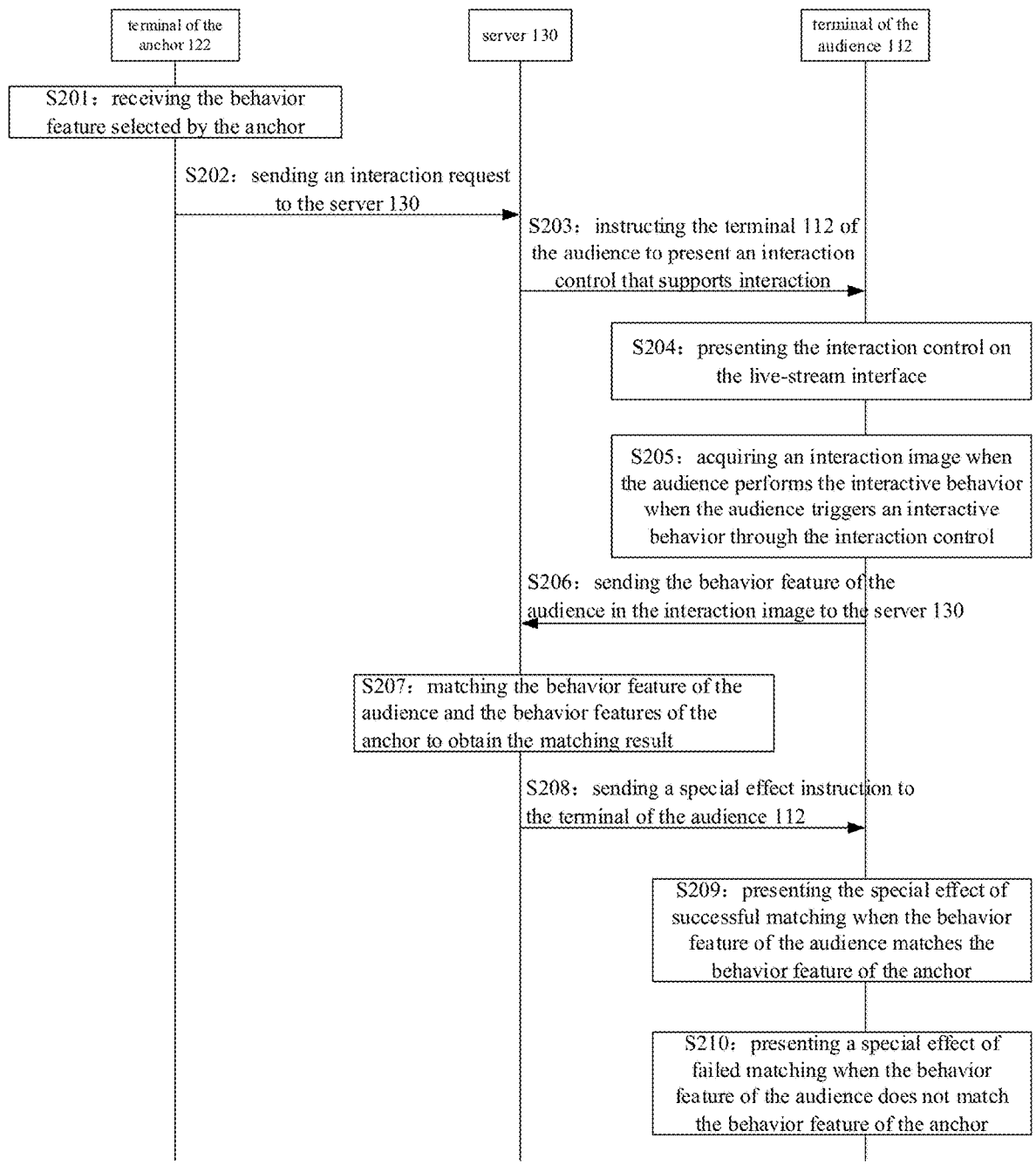
FIG. 2 is a flowchart of a live-stream interaction method provided by an embodiment of the present disclosure.

In order to make the technical scheme of the embodiment of the present disclosure clearer and easier to understand, the live-stream interaction method provided by the embodiment of the present disclosure will be introduced from the perspectives of the terminal 112 of the audience, the terminal 122 of the anchor and the server 130. FIG. 2 is a flowchart of a live-stream interaction method provided by an embodiment of the present disclosure, and the method includes:

S201: The terminal 122 of the anchor receives the behavior feature selected by the anchor.

During the live-stream, the anchor can interact with the audience, thus improving the heat of the live-stream room and attracting more audiences. In some examples, the anchor can initiate interactive activities during the live-stream, so as to improve the activity of the audience and make the audience trigger more interactive behaviors, such as sending barrage, giving likes, etc. The interactive activities may be lottery activities or interactive games. For example, the anchor can interact with the audience through the interactive games during the live-stream, and both the anchor and the audience can participate in the interactive games, so that the audience's sense of participation is improved.

In some embodiments, the anchor can initiate a lottery during the live-stream. The terminal 122 of the anchor may receive anchor pre-selection behavior feature. Among them, the behavior feature includes a limb movement feature and/or an expression feature, and the limb movement feature may be a gesture feature, a body feature, etc. Subsequently, the winning audience can be determined by the audience's guess of the behavior features selected by the anchor.

S202: The terminal 122 of the anchor sends an interaction request to the server 130 according to the behavior feature selected by the anchor.

After the terminal 122 of the anchor obtains the behavior features selected by the anchor, the terminal 122 of the anchor can send an interaction request to the server 130 based on the behavior feature of the anchor. The behavior feature of the anchor can be carried in the interactive request, so that the server 130 can obtain the behavior feature of the anchor.

It should be noted that the embodiment of the present disclosure does not specifically limit the way in which the server 130 obtains the behavior feature of the anchor, and the terminal 122 of the anchor may also directly send the behavior feature of the anchor to the server.

S203: The server 130 instructs the terminal 112 of the audience to present an interaction control that supports interaction according to the interaction request.

After the server 130 receives the interactive request, the server 130 can instruct the terminal 112 of the audience to present an interaction control that supports interaction, so that the audience can participate in the interactive activities initiated by the anchor through the interaction control that supports interaction.

S204: The terminal 112 of the audience presents the interaction control on the live-stream interface.

Figure 3:
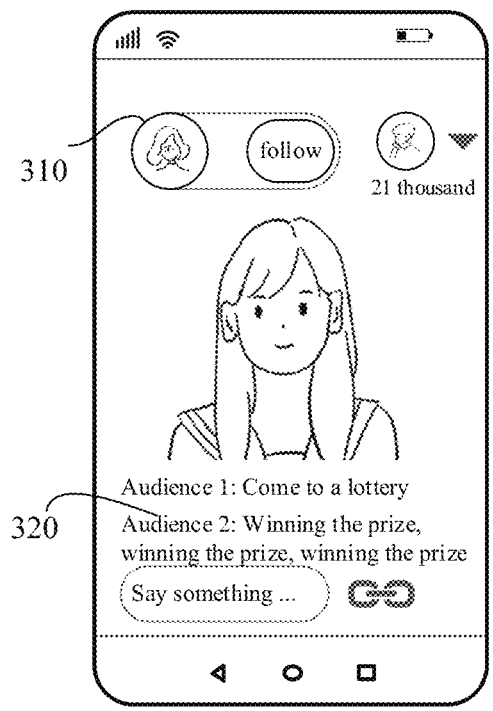
FIG. 3 is a schematic diagram of a live-stream interface provided by an embodiment of the present disclosure.

As shown in FIG. 3, this figure is a schematic diagram of a live-stream interface provided by an embodiment of the present disclosure. The terminal 112 of the audience may present a live-stream interface as shown in FIG. 3, which may include anchor information 310, a chat republic screen area 320, and the like.

Figure 4A:
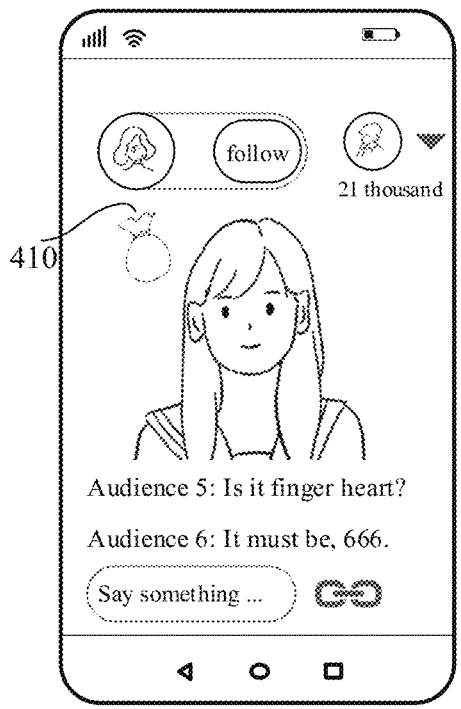
FIG. 4A is a schematic diagram of an activity portal provided by an embodiment of the present disclosure.

After the anchor initiates an interactive activity, the terminal 112 of the audience can add an activity portal on the live-stream interface shown in FIG. 3. As shown in FIG. 4A, this diagram is a schematic diagram of an activity portal provided by an embodiment of the present disclosure, and the audience can participate in interactive activities by clicking on the activity portal 410.

Figure 4B:
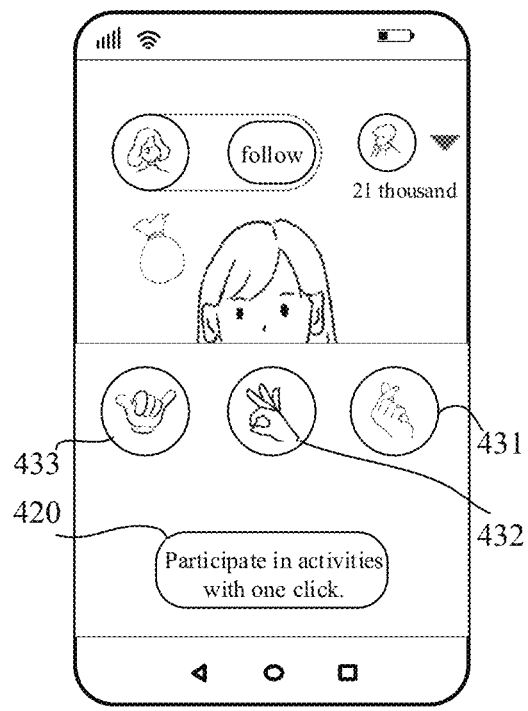
FIG. 4B is a schematic diagram of another live-stream interface provided by an embodiment of the present disclosure.

In some embodiments, after the terminal 112 of the audience detects the audience's click operation on the activity portal 410, the terminal 112 of the audience can present the interaction control that supports interaction and candidate behaviors to the audience. As shown in FIG. 4B, this diagram is a schematic diagram of another live-stream interface provided by an embodiment of the present disclosure. The live-stream interface includes an interaction control 420 that supports interaction and a plurality of candidate behaviors, such as candidate behavior 431, candidate behavior 432 and candidate behavior 433. The candidate behavior 431 may be a "gesture of finger heart", the candidate behavior 432 may be a "gesture of OK", and the candidate behavior 433 may be a "gesture of 666". The audience can select one of the above-mentioned candidate behaviors for execution. For example, the audience can select candidate behavior 432 for execution, that is, the audience makes a "gesture of OK".

The embodiment of the present disclosure does not specifically limit the position of the activity portal 410 in the live-stream interface. The activity portal 410 may be located on the left side or the right side of the live-stream interface. In some examples, the activity portal 410 may also be located in the center of the live-stream interface, so that the audience can participate in the interactive activity more directly.

S205: When the audience triggers an interactive behavior through the interaction control, the terminal 112 of the audience acquires an interaction image when the audience performs the interactive behavior.

Taking the case that the candidate behavior 432 is selected by the audience for execution as an example, the audience can trigger the interactive behavior through the interaction control 420. The audience can click on the interaction control 420, and after the terminal 112 of the audience detects the clicking operation of the interaction control 420, the interaction image when the audience performs the interactive behavior can be shot by the camera device, and the interaction image includes the behavior feature of the audience. The behavior feature includes a limb movement feature and/or an expression feature.

Figure 5A:
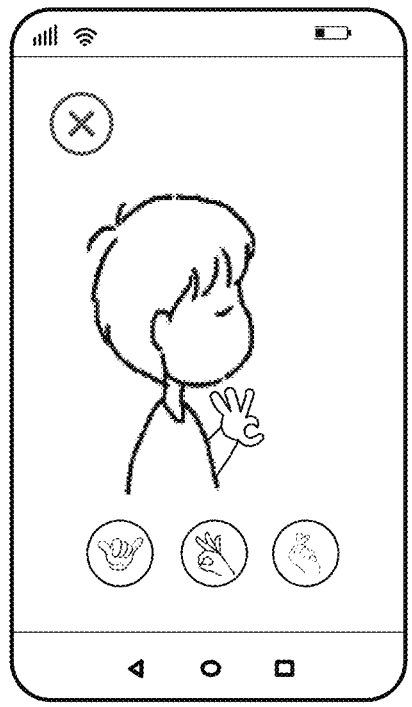
FIG. 5A is a schematic diagram of a gesture feature provided by an embodiment of the present disclosure.

As shown in FIG. 5A, this figure is a schematic diagram of a gesture feature provided by an embodiment of the present disclosure. In some examples, during the process that the audience can perform an interactive behavior based on the candidate behavior 432, the terminal 112 of the audience can acquire an image when the audience performs an interactive behavior, as shown in FIG. 5A, and the terminal 112 of the audience acquires an interaction image when the audience makes a "gesture of OK".

Figure 5B:
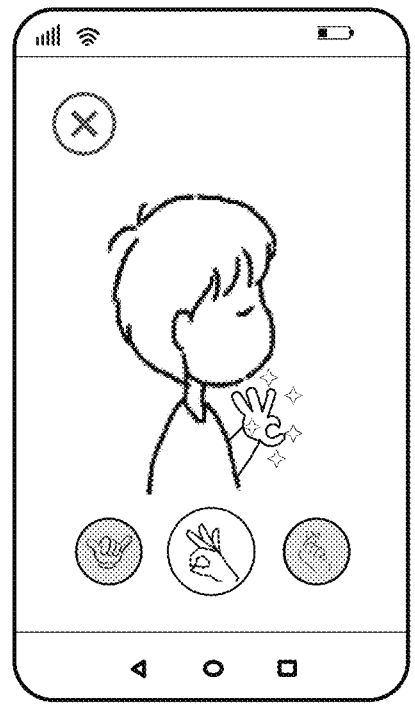
FIG. 5B is a schematic diagram of a recognition special effect provided by an embodiment of the present disclosure.

Then, after the terminal 112 of the audience obtains the interaction image when the audience performs the interactive behavior, the terminal 112 of the audience can recognize the interaction image and obtain the behavior feature of the audience in the interaction image. As shown in FIG. 5B, the terminal 112 of the audience can present a special effect that indicates the matching of the behavior features of the audience after recognizing the behavior features of the audience from the interaction image. Continuing from the above example, the interactive behavior performed by the audience is to make a "gesture of OK". When the terminal 112 of the audience recognizes the "gesture of OK" from the interaction image, it can present the special effect matching with the "gesture of OK", such as multiple "expressions of OK" falling from top to bottom. The embodiment of the present disclosure does not specifically limit the form of special effects, and presenting the special effects can give strong visual feedback to the audience and improve the audience experience.

In some embodiments, the audience can also modify the selected candidate behavior. The audience can re-execute the interactive behavior, so that the terminal 112 of the audience can re-acquire the interaction image when the audience executes the interactive behavior, so as to modify the previously selected candidate behavior. For example, the interactive behavior that the audience re-executes is a "gesture of finger heart", and the terminal 112 of the audience recognizes this "gesture of finger heart" from the new interaction image, thereby changing the "gesture of OK" to the "gesture of finger heart". Similarly, when the terminal 112 of the audience recognizes a "gesture of finger heart" from the new interaction image, the terminal 112 of the audience can present a special effect matching the "gesture of finger heart".

It should be noted that the terminal 112 of the audience needs to obtain the audience's authorization in advance, and only after acquiring the audience's authorized use of the corresponding data can the terminal 112 of the audience obtain the interaction image when the audience performs the interactive behavior.

S206: The terminal 112 of the audience sends the behavior feature of the audience in the interaction image to the server 130.

The terminal 112 of the audience can send the behavior feature of the audience recognized from the interaction image to the server 130 for comparison. Of course, in other embodiments, the terminal 112 of the audience can also directly send the interaction image to the server 130 after acquiring the interaction image when the audience performs the interactive behavior, and then the server 130 recognizes the interaction image to obtain the behavior feature of the audience.

It should be noted that the embodiment of the present disclosure does not specifically limit the way in which the server 130 obtains the behavior features of the audience, and a person skilled in the art can select the way in which the server 130 obtains the behavior features of the audience according to actual needs.

S207: The server 130 matches the behavior feature of the audience and the behavior features of the anchor to obtain the matching result.

After the server 130 obtains the behavior feature of the audience and the behavior feature of the anchor, the server 130 can match the behavior feature of the audience and the behavior feature of the anchor to obtain the matching result.

In some examples, different behavior features may correspond to different signs, for example, the "gesture of finger heart" may correspond to sign 1, the "gesture of OK" may correspond to sign 2, and the "gesture of 666" may correspond to sign 3. The server 130 can obtain the matching result based on the sign corresponding to the behavior feature of the audience and the sign corresponding to the behavior feature of the anchor. When the sign corresponding to the behavior feature of the audience is consistent with the sign corresponding to the behavior feature of the anchor, the server 130 obtains the matching result that the behavior feature of the audience matches the behavior feature of the anchor. When the sign corresponding to the behavior feature of the audience is inconsistent with the sign corresponding to the behavior feature of the anchor, the server 130 obtains the matching result that the behavior feature of the audience does not match the behavior feature of the anchor.

S208: The server 130 sends a special effect instruction to the terminal of the audience 112 according to the matching result.

The special effect instruction is used to instruct the terminal of the audience 112 to present the special effect corresponding to the matching result. In some examples, the server 130 may carry the matching result in the special effect instruction and send it to the terminal of the audience 112 together, so that the terminal of the audience 112 can know the matching result. In other examples, the server 130 can also send the matching result to the terminal of the audience 112 alone.

In some embodiments, the anchor can also set a timed time for the interactive activity, for example, the timed time is 5 minutes, and the server 130 can send a special effect instruction to the terminal of the audience 112 at the end of the timed time. In this way, the terminal of the audience 112 can only present the special effect of successful matching or failed matching after the timed time ends, giving the audience a sense of expectation and improving the audience experience.

In some embodiments, the server 130 may also send the matching result to the terminal of the anchor 122. The terminal 122 of the anchor can present the matching result to the anchor, and then the anchor can know the audience matching the behavior features of the anchor through the matching result.

S209: When the behavior feature of the audience matches the behavior feature of the anchor, the terminal of the audience 112 presents the special effect of successful matching.

Figure 6A:
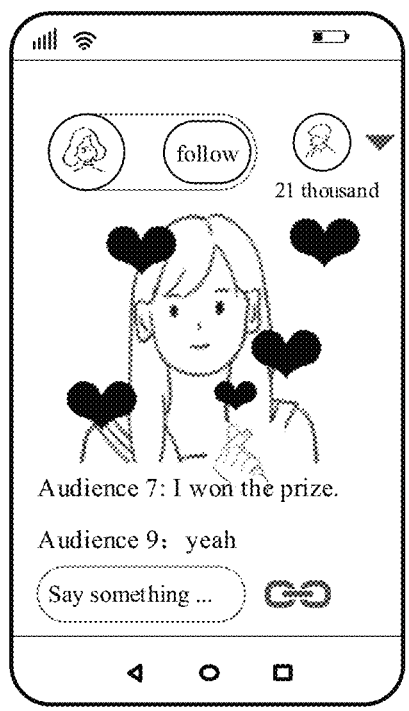
FIG. 6A is a schematic diagram of a special effect of successful matching provided by an embodiment of the present disclosure.

As shown in FIG. 6A, this figure is a schematic diagram of a special effect of successful matching provided by an embodiment of the present disclosure. Taking the case that the interactive behavior performed by the audience is a "gesture of finger heart" as an example, the special effect of successful matching may be the special effect of showing loving heart on the live-stream interface or other special effects that can show the success of matching. In this way, it can give the audience strong visual feedback, improve the audience's sense of participation in the interactive activities and improve the audience experience.

Figure 6B:
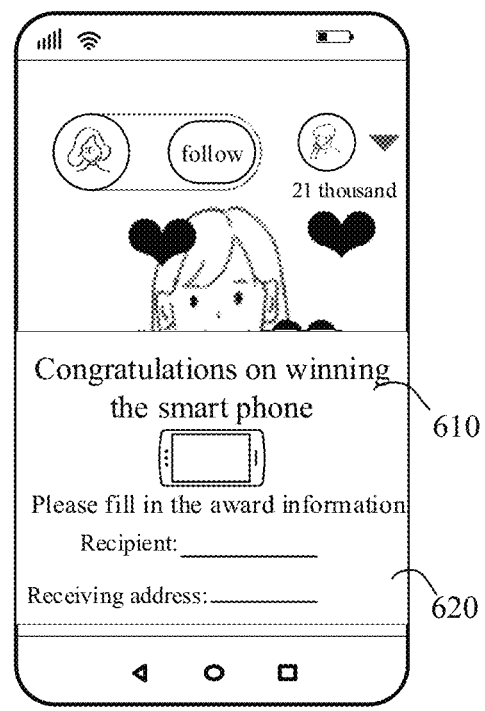
FIG. 6B is a schematic diagram of a winning prompt information provided by an embodiment of the present disclosure.

In some embodiments, the interactive activity may be a lottery activity, and when the behavior feature of the audience matches the behavior feature of the anchor, the audience can be characterized as winning the prize. As shown in FIG. 6B, this figure is a schematic diagram of a prize-winning prompt information provided by an embodiment of the present disclosure. The terminal of the audience 112 can present the prize-winning prompt information 610 and the prize-winning information input area 620 on the live-stream interface. Among them, the prize-winning prompt information 610 is used to prompt the audience to win the prize, and the audience can input the winning information in the prize-winning information input area 620 based on the prize-winning prompt information 610.

In some examples, the prize may be a physical prize, and the prize-winning information may be the mailing address entered by the audience, the recipient information (recipient name, recipient contact information) and so on. Based on this, the terminal of the audience 112 can forward the prize-winning information to the terminal of the anchor 122 through the server 130, so that the anchor can mail the prize to the audience according to the prize-winning information.

In other examples, the prize may also be a virtual prize (e.g., electronic coupon, electronic red-envelope), and the prize-winning information may be an account entered by the audience. The terminal of the audience 112 can forward the prize-winning information to the terminal of the anchor 122 through the server 130, so that the anchor can recharge the virtual prize into the account input by the audience according to the prize-winning information. Furthermore, the virtual prize is acquired by the audience through the interactive behavior and participation in the interactive activities, so that the audience can use the electronic coupons in the virtual prize more easily.

S210: When the behavior feature of the audience does not match the behavior feature of the anchor, the terminal of the audience 112 presents a special effect of failed matching.

As shown in FIG. 7A, this figure is a schematic diagram of a special effect of failed matching provided by an embodiment of the present disclosure. For example, the case that the interactive behavior performed by the audience is a "gesture of finger heart" and the behavior feature selected by the anchor is a "gesture of OK" as an example, the special effect of failed matching may be a special effect in which the "gesture of finger heart" and the "gesture of OK" collide with each other into pieces, or other special effects that can indicate the failure of matching.

Continuing the above example, taking the case that the interactive activity is a lottery activity as an example, when the behavior feature of the audience does not match the behavior feature of the anchor, it can be characterized that the audience has not won the prize. As shown in FIG. 7B, this figure is a schematic diagram of a non-winning prompt message provided by an embodiment of the present disclosure. The terminal of the audience 112 can present the non-winning prompt message 710 on the live-stream interface. In some examples, the non-winning prompt message may be "Sorry, you didn't win the prize".

Based on the above description, the embodiment of the present disclosure provides a live-stream interaction method, in which an audience can trigger an interactive behavior through an interaction control in a live-stream interface presented by the terminal of the audience, and when the audience triggers an interactive behavior through the interaction control, the terminal of the audience can obtain an interaction image when the audience performs the interactive behavior, so that the audience can feel a unique sense of participation in the interaction with the anchor. Moreover, the interaction image of the audience also carries the behavior feature of the audience. When the behavior feature of the audience matches the behavior feature of the anchor, the terminal of the audience presents a special effect of successful matching on the live-stream interface, so that the audience can perceive the feedback from the anchor and the audience experience is improved.

FIG. 8 is a schematic diagram of a live-stream interaction device according to an exemplary embodiment of the present disclosure, which can realize the functions of the above-mentioned terminal 112 of the audience. As shown in FIG. 8, the live-stream interaction device 800 includes:

a display module 801 configured to present a live-stream interface including an interaction control that supports interaction;

an acquisition module 802 configured to acquire an interaction image when the audience triggers an interactive behavior through the interaction control; the interaction image includes a behavior feature of the audience;

the display module 801 is further configured to present the special effect of successful matching on the live-stream interface when the behavior feature of the audience matches the behavior feature of the anchor.

Optionally, the acquisition module 802 is specifically configured to present a candidate behavior to the audience, and acquire an interaction image when the audience performs the interactive behavior based on the candidate behavior.

Optionally, the behavior feature includes a limb movement feature and/or an expression feature.

Optionally, the acquisition module 802 is further configured to acquire the behavior feature of the audience according to the interaction image;

the display module 801 is further configured to present a special effect matching the behavior feature of the audience according to the behavior feature of the audience.

Optionally, the display module 801 is further configured to present a special effect of failed matching on the live-stream interface when the behavior feature of the audience does not match the behavior feature of the anchor.

Optionally, the display module 801 is further configured to present prize-winning prompt information on the live-stream interface;

the acquisition module 802 is further configured to acquire prize-winning information input by the audience based on the prize-winning prompt information.

The functions of the above-mentioned modules have been described in detail in the method steps in the previous embodiment, and will not be repeated here.

FIG. 9 is a schematic diagram of a live-stream interaction device according to an exemplary disclosed embodiment, which can realize the functions of the above server 130. As shown in FIG. 9, the live-stream interaction device 900 includes:

an acquisition module 901 configured to acquire the behavior feature of the audience and the behavior feature of the anchor; the behavior feature of the audience is acquired based on the interaction images when the audience performs the interactive behavior;

a matching module 902 configured to match the behavior features of the audience and the behavior feature of the anchor to obtain a matching result; according to the matching result, and send a special effect instruction to the terminal of the audience; the special effect instruction is used to instruct the terminal of the audience to present the special effect corresponding to the matching result.

Optionally, the behavior feature includes a limb movement feature and/or an expression feature.

The functions of the above-mentioned modules have been described in detail in the method steps in the previous embodiment, and will not be repeated here.

Figure 10:
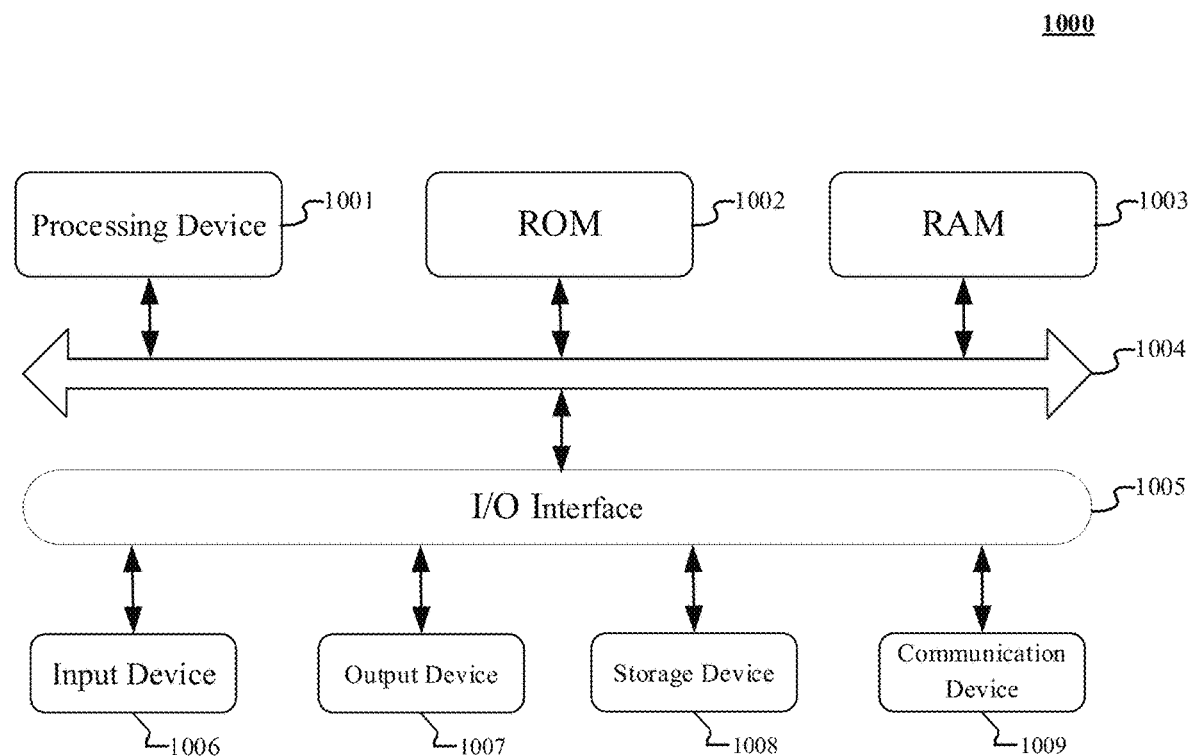
FIG. 10 is a schematic structural diagram of an electronic apparatus provided by an embodiment of the present disclosure.

Next, referring to FIG. 10, which shows a structural schematic diagram of an electronic apparatus 1000 suitable for realizing the embodiment of the present disclosure. The electronic apparatus may be a terminal 112 of an audience, and the terminal 112 of the audience is configured to realize the corresponding functions of the live-stream interaction device 800 shown in FIG. 8; the electronic apparatus may also be a server 130, and the server 130 is configured to realize the functions corresponding to the live-stream interaction device 900 shown in FIG. 9. The electronic apparatus shown in FIG. 10 is only an example, and should not bring any limitation to the function and application scope of the embodiment of the present disclosure.

As shown in FIG. 10, the electronic apparatus 1000 may include a processing device (such as a central processing unit, a graphics processor, etc.) 1001, which may perform various appropriate actions and processes according to a program stored in a read-only memory (ROM) 1002 or a program loaded from a storage device 1008 into a random access memory (RAM) 1003. In the RAM 1003, various programs and data required for the operation of the electronic apparatus 1000 are also stored. A processing device 1001, a ROM 1002 and a RAM 1003 are connected to each other through a bus 1004. An input/output (I/O) interface 1005 is also connected to the bus 1004.

Generally, the following devices may be connected to the I/O interface 1005, including an input device 1006 such as a touch screen, a touch pad, a keyboard, a mouse, a camera, a microphone, an accelerometer, a gyroscope, and the like, an output device 1007 such as a liquid crystal display (LCD), a speaker, a vibrator, and the like, a storage device 1008 such as a magnetic tape, a hard disk, and the like, and a communication device 1009. The communication device 1009 may allow the electronic apparatus 1000 to communicate wirelessly or wired with other devices to exchange data. Although FIG. 10 shows an electronic apparatus 1000 with various devices, it should be understood that it is not required to implement or have all the devices shown. More or fewer devices may alternatively be implemented or provided.

In particular, according to the embodiments of the present disclosure, the process described above with reference to the flowchart can be implemented as a computer software program. For example, at least an embodiment of the present disclosure includes a computer program product including a computer program carried on a non-transitory computer-readable medium, which contains program code for executing the method shown in the flowchart. In such an embodiment, the computer program can be downloaded and installed from the network through the communication device 1009, or installed from the storage device 1008, or installed from the ROM 1002. When the computer program is executed by the processing device 1001, the above functions defined in the method of the embodiment of the present disclosure are performed.

It should be noted that the computer-readable medium mentioned in the embodiment of this disclosure may be a computer-readable signal medium or a computer-readable storage medium or any combination of the two. The computer-readable storage medium may be, for example, but not limited to, an electrical, magnetic, optical, electromagnetic, infrared, or semiconductor system, device or device, or a combination of any of the above. More specific examples of computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the embodiments of that present disclosure, the computer-readable storage medium may be any tangible medium containing or store a program, which can be used by or in combination with an instruction execution system, apparatus or device. And in the embodiments of the present disclosure, the computer-readable signal medium may include a data signal propagate in a baseband or as a part of a carrier wave, in which a computer-readable program code is carry. This propagated data signal may take many forms, including but not limited to electromagnetic signals, optical signals or any suitable combination of the above. A computer-readable signal medium may also be any computer-readable medium other than a computer-readable storage medium, which can send, propagate or transmit a program for use by or in connection with an instruction execution system, apparatus or device. The program code contained in the computer-readable medium can be transmitted by any suitable medium, including but not limited to: wires, optical cables, RF (radio frequency) and the like, or any suitable combination of the above.

In some embodiments, the client and the server can communicate by using any currently known or future developed network protocol such as HTTP (Hyper Text Transfer Protocol), and may be interconnected with digital data communication in any form or medium (for example, communication network). Examples of communication networks include a local area network ("LAN"), a wide area network ("WAN"), the international network (for example, the Internet) and an end-to-end network (for example, ad hoc end-to-end network), as well as any currently known or future developed networks.

The computer-readable medium may be included in the electronic apparatus, or may exist alone without being assembled into the electronic apparatus.

The computer-readable medium carries one or more programs, and when the one or more programs are executed by the electronic apparatus, the electronic apparatus is caused to perform the following steps:

presenting the live-stream interface, in which the live-stream interface comprises the interaction control that supports interaction;

when an audience triggers an interactive behavior through the interaction control, acquiring an interaction image when the audience performs the interactive behavior, in which the interaction image includes a behavior feature of the audience;

when the behavior feature of the audience matches the behavior features of the anchor, presenting the special effect of successful matching on the live-stream interface; or, acquiring the behavior feature of the audience and the behavior feature of the anchor;

the behavior feature of the audience is acquired based on the interaction image when the audience performs the interactive behavior;

matching the behavior feature of the audience and the behavior feature of the anchor to obtain a matching result; according to the matching result, sending a special effect instruction to the terminal of the audience, in which the special effect instruction is used to instruct the terminal of the audience to present the special effect corresponding to the matching result.

Computer program codes for performing the operations of the present disclosure may be written in one or more programming languages or their combinations, including but not limited to object-oriented programming languages such as Java, Smalltalk, C++, as well as conventional procedural programming languages such as "C" or similar programming languages. The program code can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or a part of code that contains one or more executable instructions for implementing specified logical functions. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The modules described in the embodiment of the present disclosure can be realized by software or can be realized by hardware. Among them, the name of the module does not constitute the limitation of the module itself in some cases. For example, the first acquisition module can also be described as "a module that acquires at least two Internet protocol addresses".

The functions described above herein may be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of embodiments of the present disclosure, a machine-readable medium may be a tangible medium, which may contain or store a program for use by or in combination with an instruction execution system, apparatus or device. The machine-readable medium may be a machine-readable signal medium or a machine-readable storage medium. A machine-readable medium may include, but is not limited to, an electronic, magnetic, optical, electromagnetic, infrared, or semiconductor system, device or equipment, or any suitable combination of the above. More specific examples of the machine-readable storage medium may include an electrical connection based on one or more lines, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

According to one or more embodiments of the present disclosure, Example 1 provides a live-stream interaction method, and the method is applied to a terminal; the method comprises the following steps:

presenting a live-stream interface, in which the live-stream interface comprises an interaction control that supports interaction;

when an audience triggers an interactive behavior through the interaction control, acquiring an interaction image when the audience performs the interactive behavior, in which the interaction image includes a behavior feature of the audience; and when the behavior feature of the audience matches the behavior feature of the anchor, presenting a special effect of successful matching on the live-stream interface.

According to one or more embodiments of the present disclosure, Example 2 provides the method of Example 1, and the acquiring the interaction image when the audience performs the interactive behavior includes:

presenting a candidate behavior to the audience; and acquiring the interaction image when the audience performs the interactive behavior based on the candidate behavior.

According to one or more embodiments of the present disclosure, Example 3 provides the methods of Example 1 or Example 2, and the behavior feature includes a limb movement feature and/or an expression feature.

According to one or more embodiments of the present disclosure, Example 4 provides the methods of Examples 1 to 3, and the method further comprises:

acquiring the behavior feature of the audience according to the interaction image; and presenting a special effect matched with the behavior feature of the audience according to the behavior feature of the audience.

According to one or more embodiments of the present disclosure, Example 5 provides the methods of Examples 1 to 4, and the method further comprises:

presenting the special effects of failed matching on the live-stream interface, when the behavior feature of the audience does not match the behavior feature of the anchor.

According to one or more embodiments of the present disclosure, Example 6 provides the methods of Examples 1 to 4, and the method further comprises:

presenting prize-winning prompt information on the live-stream interface; and acquiring prize-winning information input by the audience based on the prize-winning prompt information.

According to one or more embodiments of the present disclosure, Example 7 provides a live-stream interaction method, which is applied to a server; the method comprises the following steps:

acquiring the behavior feature of the audience and the behavior feature of the anchor, in which the behavior feature of the audience is acquired based on the interaction image when the audience performs an interactive behavior;

matching the behavior feature of the audience and the behavior feature of the anchor to obtain a matching result; and sending a special effect instruction to the terminal of the audience according to the matching result, in which the special effect instruction is used to instruct the terminal of the audience to present the special effect corresponding to the matching result.

According to one or more embodiments of the present disclosure, Example 8 provides the method of Example 7, and the behavior feature includes a limb movement feature and/or an expression feature.

According to one or more embodiments of the present disclosure, Example 9 provides a live-stream interaction system, including a terminal of the audience, a terminal of the anchor and a server;

the terminal of the audience is configured to present a live-stream interface, and the live-stream interface comprises an interaction control that supports interaction; when an interactive behavior is triggered by the audience through the interaction control, an interaction image when the audience performs the interactive behavior is obtained; the interaction image includes the behavior feature of the audience;

the terminal of the anchor is configured to send the behavior features of the anchor to the server;

the server is configured to acquire the behavior feature of the audience, match the behavior feature of the audience with the behavior feature of the anchor, and obtain a matching result; and the server is configured to send a special effect instruction to the terminal of the audience according to the matching result; the special effect instruction is used for instructing the terminal of the audience to present the special effect corresponding to the matching result;

the terminal of the audience is further configured to present the special effect corresponding to the matching result according to the special effect instruction.

According to one or more embodiments of the present disclosure, Example 10 provides a live-stream interaction device which includes:

a display module configured to present a live-stream interface, in which the live-stream interface comprises an interaction control that supports interaction; and an acquisition module configured to acquire an interaction image when an audience triggers the interactive behavior through the interaction control, in which the interaction image includes a behavior feature of the audience;

the display module is further configured to present a special effect of successful matching on the live-stream interface when the behavior feature of the audience matches the behavior feature of the anchor.

According to one or more embodiments of the present disclosure, Example 11 provides the apparatus of Example 10, the acquisition module is specifically configured to present a candidate behavior to the audience, acquire an interaction image when the audience performs the interactive behavior based on the candidate behavior.

According to one or more embodiments of the present disclosure, Example 12 provides the device of Example 10 or 11, and the behavior feature includes a limb movement feature and/or an expression feature.

According to one or more embodiments of the present disclosure, Example 13 provides the devices of Examples 10 to 12, and the acquisition module is further configured to acquire the behavior feature of the audience according to the interaction image; the display module is further configured to present the special effect matching with the behavior feature of the audience according to the behavior feature of the audience.

According to one or more embodiments of the present disclosure, Example 14 provides the devices of Examples 10 to 13, and the display module is further configured to present the special effect of failed matching on the live-stream interface when the behavior feature of the audience does not match the behavior feature of the anchor.

According to one or more embodiments of the present disclosure, Example 15 provides the devices of Examples 10 to 13, and the display module is further configured to present prize-winning prompt information on the live-stream interface; the acquisition module is further configured to acquire prize-winning information input by the audience based on the prize-winning prompt information.

According to one or more embodiments of the present disclosure, Example 16 provides a live-stream interaction device which includes:
an acquisition module configured to acquire the behavior feature of the audience and the behavior feature of the anchor; the behavior feature of the audience is acquired based on the interaction image when the audience performs the interactive behavior; and
a matching module configured to match the behavior feature of the audience and the behavior feature of the anchor to obtain a matching result;
according to the matching result, a special effect instruction is sent to the terminal of the audience; the special effect instruction is used to instruct the terminal of the audience to present the special effect corresponding to the matching result.

According to one or more embodiments of the present disclosure, Example 17 provides the device of Example 16, and the behavior feature includes a limb movement feature and/or an expression feature.

The above description is only the preferred embodiment of the present disclosure and the explanation of the applied technical principles. It should be understood by those skilled in the art that the disclosure scope involved in the embodiment of this disclosure is not limited to the technical scheme formed by the specific combination of the above technical features, but also covers other technical schemes formed by any combination of the above technical features or their equivalent features without departing from the above disclosure concept. For example, the above features are replaced with (but not limited to) technical features with similar functions disclosed in the embodiment of this disclosure.

Furthermore, although the operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the subject matter has been described in language specific to structural features and/or methodological logical acts, it should be understood that the subject matter defined in the appended claims is not necessarily limited to the specific features or acts described above. On the contrary, the specific features and actions described above are only exemplary forms of implementing the claims. With regard to the device in the above embodiment, the specific way in which each module performs operations has been described in detail in the embodiment of the method, and will not be described in detail here.

The invention claimed is:

1. A live-stream interaction method, being applied to a terminal, wherein the method comprises:
presenting a live-stream interface of an anchor, wherein the live-stream interface comprises an interaction control that supports interaction;
in response to an audience triggers an interactive behavior through the interaction control being triggered by the audience, acquiring an interaction image of when the audience performs the interactive behavior, wherein the interaction image comprises a behavior feature of the audience; and
in response to the behavior feature of the audience matches a behavior feature of the anchor, presenting a special effect of successful matching between the behavior feature of the audience and the behavior feature of the anchor on the live-stream interface of the anchor;
wherein the acquiring the interaction image of when the audience performs the interactive behavior comprises:
presenting a candidate behavior to the audience on the live-stream interface of the anchor; and
acquiring an interaction image of when the audience performs the interactive behavior, wherein the interactive behavior is performed based on the candidate behavior selected by the audience,
wherein the method further comprises:
in response to the audience modifies the candidate behavior to another candidate behavior, acquiring another interaction image of when the audience performs an interactive behavior corresponding to the another candidate behavior; and
in response to the behavior feature corresponding to the another candidate behavior matches the behavior feature of the anchor, presenting the special effect of successful matching between the behavior feature of the audience and the behavior feature of the anchor on the live-stream interface of the anchor.

2. The method according to claim 1, wherein the behavior feature comprises a limb movement feature and/or an expression feature.

3. The method according to claim 1, wherein the method further comprises:
acquiring the behavior feature of the audience according to the interaction image; and
according to the behavior feature of the audience, presenting a special effect matched with the behavior feature of the audience.

4. The method according to claim 1, wherein the method further comprises:

when the behavior feature of the audience does not match the behavior feature of the anchor, presenting a special effect of failed matching on the live-stream interface.

5. The method according to claim 1, wherein the method further comprises:
presenting prize-winning prompt information on the live-stream interface; and
acquiring prize-winning information input by the audience based on the prize-winning prompt information.

6. An electronic apparatus, comprising:
a storage device, on which a computer program is stored; and
a processing device, configured to execute the computer program in the storage device to realize the steps of the method according to claim 1.

7. The electronic apparatus according to claim 6, wherein the behavior feature comprises a limb movement feature and/or an expression feature.

8. The electronic apparatus according to claim 6, wherein the method further comprises:
acquiring the behavior feature of the audience according to the interaction image; and
according to the behavior feature of the audience, presenting a special effect matched with the behavior feature of the audience.

9. The electronic apparatus according to claim 6, wherein the method further comprises:
when the behavior feature of the audience does not match the behavior feature of the anchor, presenting a special effect of failed matching on the live-stream interface.

10. The electronic apparatus according to claim 6, wherein the method further comprises:
presenting prize-winning prompt information on the live-stream interface; and
acquiring prize-winning information input by the audience based on the prize-winning prompt information.

11. A non-transitory computer-readable storage medium, storing a computer program which, realizes steps of the method according to claim 1 when executed by a processing device.

12. The non-transitory computer-readable storage medium according to claim 11, wherein the behavior feature comprises a limb movement feature and/or an expression feature.

13. The non-transitory computer-readable storage medium according to claim 11, wherein the method further comprises:
acquiring the behavior feature of the audience according to the interaction image; and
according to the behavior feature of the audience, presenting a special effect matched with the behavior feature of the audience.

14. The non-transitory computer-readable storage medium according to claim 11, wherein the method further comprises:
when the behavior feature of the audience does not match the behavior feature of the anchor, presenting a special effect of failed matching on the live-stream interface.

15. A live-stream interaction method, being applied to a server, wherein the method comprises:
acquiring a behavior feature of an audience and a behavior feature of an anchor, wherein the behavior feature of the audience is acquired based on an interaction image of when the audience performs an interactive behavior through an interaction control being triggered by the audience; and
matching the behavior feature of the audience and the behavior feature of the anchor to obtain a matching result; sending a special effect instruction to a terminal of the audience according to the matching result, wherein the special effect instruction is used to instruct the terminal of the audience to present a special effect on a live-stream interface of the anchor corresponding to the matching result;
wherein the interaction image of when the audience performs an interactive behavior is an interaction image acquired when the audience triggers the interactive behavior to generate a candidate behavior, and performs the interactive behavior based on the candidate behavior selected by the audience,
wherein the method further comprises:
in response to acquiring another interaction image of when the audience performs an interactive behavior corresponding to another candidate behavior, matching the behavior feature corresponding to the another candidate behavior with the behavior feature of the anchor to obtain the matching result and sending the special effect instruction to the terminal of the audience according to the matching result.

16. The method according to claim 15, wherein the behavior feature comprises a limb movement feature and/or an expression feature.

17. An electronic apparatus, comprising:
a storage device, on which a computer program is stored; and
a processing device, configured to execute the computer program in the storage device to realize the steps of the method according to claim 7.

18. The electronic apparatus according to claim 17, wherein the behavior feature comprises a limb movement feature and/or an expression feature.

19. A non-transitory computer-readable storage medium, storing a computer program which, realizes steps of the method according to claim 15 when executed by a processing device.

20. A live-stream interaction system, comprising a terminal of an audience, a terminal of an anchor and a server, wherein
the terminal of the audience is configured to present a live-stream interface of an anchor, and the live-stream interface comprises an interaction control that supports interaction; in response to an audience triggers an interactive behavior through the interaction control being triggered by the audience, the terminal of the audience obtains an interaction image of when the audience performs the interactive behavior, wherein the interaction image comprises a behavior feature of the audience;
a terminal of the anchor is configured to send the behavior feature of the anchor to the server;
the server is configured to acquire the behavior feature of the audience, match the behavior feature of the audience with the behavior feature of the anchor, obtain a matching result, and send a special effect instruction to the terminal of the audience according to the matching result, wherein the special effect instruction is configured to instruct the terminal of the audience to present the special effect corresponding to the matching result;
the terminal of the audience is further configured to present the special effect corresponding to the matching result according to the special effect instruction;
wherein when the audience triggers the interactive behavior through the interaction control, the terminal of the audience obtains the interaction image of when the audience performs the interactive behavior comprises:

the terminal of the audience presents a candidate behavior to the audience on the live-stream interface of the anchor; and the terminal of the audience acquires the interaction image of when the audience performs the interactive behavior, wherein the interactive behavior is performed based on the candidate behavior selected by the audience wherein the terminal of the audience is further configured to:

in response to the audience modifies the candidate behavior to another candidate behavior, acquire another interaction image of when the audience performs an interactive behavior corresponding to the another candidate behavior; and in response to the behavior feature corresponding to the another candidate behavior matches the behavior feature of the anchor, present the special effect of successful matching between the behavior feature of the audience and the behavior feature of the anchor on the live-stream interface of the anchor, and wherein the server is further configured to:

in response to acquiring another interaction image of when the audience performs an interactive behavior corresponding to another candidate behavior, match the behavior feature corresponding to the another candidate behavior with the behavior feature of the anchor to obtain the matching result and send the special effect instruction to the terminal of the audience according to the matching result.

\* \* \* \* \*